(12) United States Patent
Takenaka et al.

(10) Patent No.: US 6,401,846 B1
(45) Date of Patent: Jun. 11, 2002

(54) KNEE PAD FOR A LEGGED WALKING ROBOT

(75) Inventors: Toru Takenaka; Takayuki Kawai; Hiroshi Gomi; Tadaaki Hasegawa; Takashi Matsumoto, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/630,743

(22) Filed: Aug. 2, 2000

(30) Foreign Application Priority Data

Aug. 30, 1999 (JP) .......................................... 11-243449

(51) Int. Cl.[7] ............................................. B62D 57/02
(52) U.S. Cl. ............................................ 180/8.6; 901/1
(58) Field of Search .......................... 180/8.1, 8.2, 8.5, 180/8.6; 901/1

(56) References Cited

U.S. PATENT DOCUMENTS 5,255,753 A * 10/1993 Nishikawa et al. .......... 180/8.1
5,455,497 A * 10/1995 Hirose et al. ................ 180/8.1
6,109,378 A * 8/2000 Paakkunainen ............. 180/8.5

FOREIGN PATENT DOCUMENTS

EP 1 081 026 A2 * 3/2001 ............ B25J/05/00
JP 11-48170 2/1999

* cited by examiner

Primary Examiner—Kevin Hurley
(74) Attorney, Agent, or Firm—Arent Fox Kintner Plotkin & Kahn, PLLC

(57) ABSTRACT

In a biped walking robot having a body and two articulated legs each connected to the body through a hip joint and having a knee joint and an ankle joint, connected by a shank link, a knee pad is mounted on the shank link as a landing/shock absorbing means at a position adjacent to the knee joint which is brought into contact with the floor when coming into knee-first contact with the floor such that the knee joint is to be positioned at a location forward of the center of gravity of the robot in a direction of robot advance, while absorbing impact occurring from the contact with the floor. With this, the robot can be easily stood up from an attitude with its knee joint regions in contact with the floor. Moreover, when coming into knee-first contact with the floor, it can absorb the impact of the contact to protect the knee joint regions and the floor from damage.

28 Claims, 19 Drawing Sheets

KNEE PAD FOR A LEGGED WALKING ROBOT

BACKGROUND OF THE INVENTION

1. Field of the Invention

This invention relates to a legged walking robot, particularly a biped walking robot.

2. Description of the Related Art

A legged walking robot, specifically a biped walking robot, is taught in, for example, Japanese Laid-open Patent Application No. Hei. 11(1999)-48170. In this prior art, upon discriminating that the robot is in danger of falling down, a movable arm is brought into contact with the floor (or ground) to prevent falling.

Legged walking robots, particularly biped walking robots, are structurally unstable. They are apt to losing their balance and toppling during walking when subjected to an unexpected external force, such as upon collision with an obstacle, or when encountering unexpected irregularities in the floor surface. When a robot falls forward, it generally comes down on its knee joint regions. These regions of the robot receiving the impact are likely to be damaged. The floor or other structure struck by the robot may also be damaged.

On the other hand, when a robot falls sideways or backwards and regions around the knee joint regions have come in contact with the floor (kneeling state), an attempt to make the robot stand by controlled driving will be futile if the robot's center of gravity is located forward of the knee joint regions in contact with the floor. The same problem always arises when trying to make the robot stand from a kneeling attitude, even when it did not fall down but was deliberately controlled into a kneeling attitude to carry out a particular job.

This will be better understood from FIG. 19. FIG. 19A shows the robot in a kneeling attitude, i.e., with its feet, knee joint regions, and movable arms in contact with the floor. The attitude shown is that resulting from controlling to drive robot joints for restoring the robot to the standing attitude. Specifically, the movable arms are extended to maximum length, the knee joints are bent to the limit, and the thigh links and shank (crus) links are driven to the permissible minimum angle therebetween. The robot's center of gravity XG is forward of the point at which the knee joint regions come into contact with floor, hereinafter referred to as knee floor contact point Xknee.

The knee floor contact point Xknee and the center of gravity XG are represented as distances along the x axis from the origin of a coordinate system whose origin is the floor contact point directly under an ankle joint and whose x axis lies in the direction of robot advance.

Where the robot mass is m and acceleration of gravity is g, a force of F=mg is exerted downward at the center of gravity XG of the robot, and floor reaction forces f1, f2 and f3 occur at the points where the feet, knee joint regions and movable arms make contact with the floor, thereby maintaining equilibrium (F=f1+f2+f3).

In order to stand the robot from this state, its joints have to be driven to move the body rearward. However, the robot's center of gravity lies forward of the knee floor contact point (Xknee<XG). Therefore, as shown in FIG. 19B, the downward force F at the robot's center of gravity XG operates as a force causing the robot to fall forward.

More specifically, the robot becomes incapable of holding its attitude because the moment produced around Xknee prevents production of a negative floor reaction force (downward force) at the feet. In this state, the body cannot be controlled by joint driving and, instead, the legs rotate forward around the knees joints. This raises the feet off the floor and makes it impossible to restore the robot to a standing attitude.

SUMMARY OF THE INVENTION

A first object of the present invention is therefore to provide a legged walking robot, more specifically, a biped walking robot, that can be easily stood up from an attitude with its knee joint regions in contact with the floor, i.e., from a kneeling attitude.

As previously stated, when a legged walking robot, particularly a biped walking robot, falls forward, it generally comes down on its knee joint regions. The regions of the robot receiving the impact are likely to be damaged. The floor or other structure struck by the robot may also be damaged.

A second object of the present invention is therefore to provide a legged walking robot, more specifically, a biped walking robot, that when coming into knee-first contact with the floor can absorb the impact of the contact to protect its knee joint regions and the floor from damage.

For realizing these objects, the present invention provides in a first aspect a legged walking robot having at least a body and a plurality of articulated legs each connected to the body through a hip joint and having a knee joint and an ankle joint; wherein the improvement comprises: a landing means is mounted at a position adjacent to the knee joint which is brought into contact with a floor when coming into knee-first contact with the floor such that the knee joint is to be positioned at a location forward of the center of gravity of the robot in a direction of robot advance.

For realizing these objects, the present invention provides in a second aspect a legged walking robot having at least a body and a plurality of articulated legs each connected to the body through a hip joint and having a knee joint and an ankle joint wherein the improvement comprises: a shock absorbing means is mounted at a position adjacent to the knee joint which is brought into contact with a floor to absorb impact occurring from the contact with the floor when coming into knee-first contact with the floor.

BRIEF DESCRIPTION OF THE DRAWINGS

The above and other objects and advantages of the invention will be more apparent from the following descriptions and drawings, in which.

DETAILED DESCRIPTION OF THE PREFERRED EMBODIMENTS

Legged walking robots that are embodiments of the invention will now be explained with reference to the drawings. Biped walking robots will be taken up as examples of legged walking robots.

Figure 1:
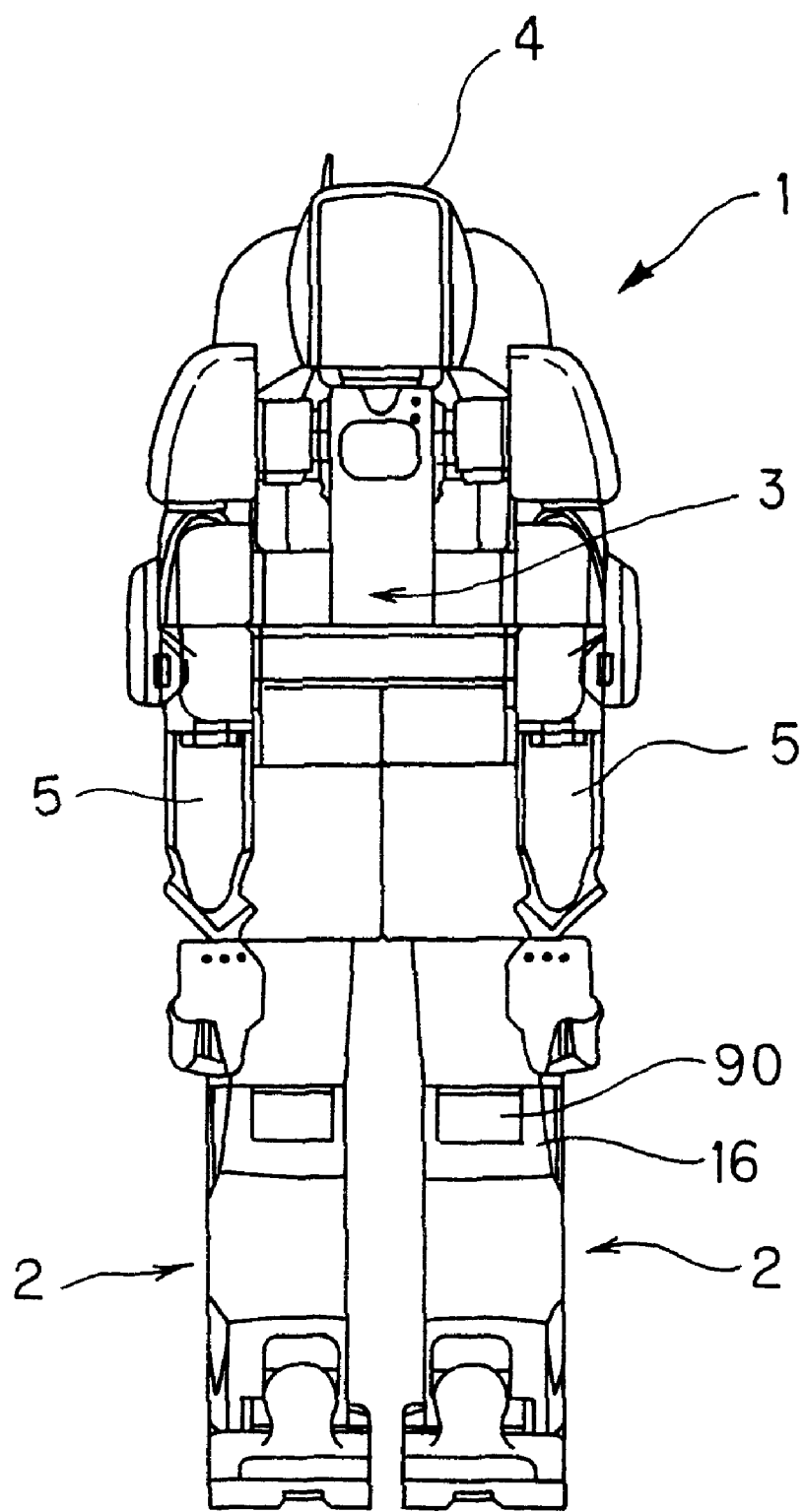
FIG. 1 is a front view of a legged walking robot, more specifically a biped walking robot, according to the present invention.
Figure 2:
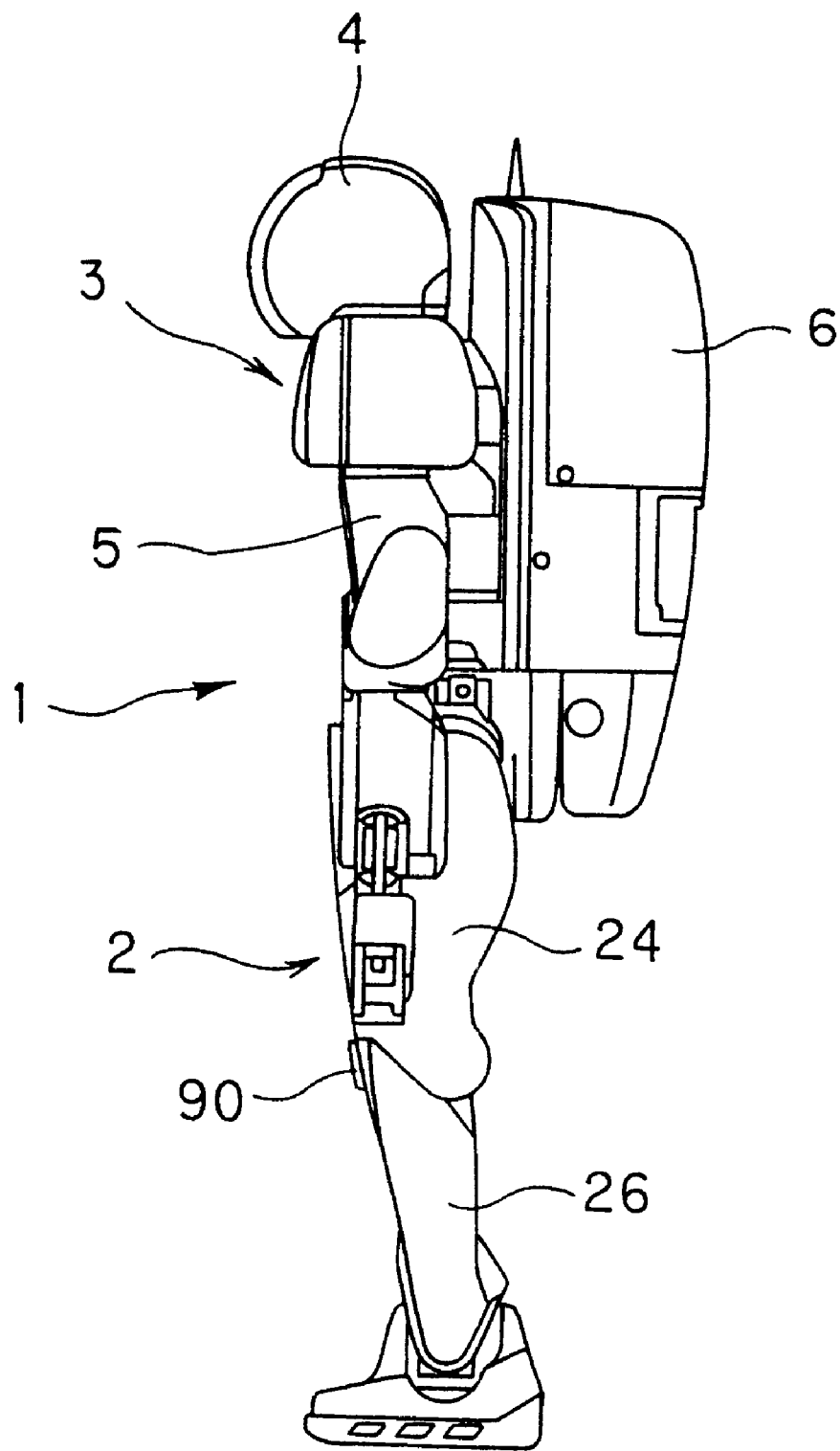
FIG. 2 is a side view of the robot illustrated in FIG. 1.

FIG. 1 is a front view of a legged walking robot according to the present invention. FIG. 2 is a side view of the same.

As shown in FIG. 1, the legged walking robot (hereinafter referred to as "robot 1") is equipped with a pair of leg links (articulated legs) 2 and a body 3 located above the leg links 2. A head 4 is formed on the upper end of the body 3 and arm links (articulated arms) 5 are connected to opposite sides of the body 3. As shown in FIG. 2, a housing unit 6 is mounted on the back of the body 3 for accommodating, among other things, a control unit (explained later) and a power supply battery for operating the motors that drive the joints of the robot 1.

The internal structure of the robot 1 will now be explained chiefly with reference to FIG. 3.

As illustrated, the robot 1 has right and left leg links (legs) 2 each having six joints. (To make the arrangement easier to understand, all of the joints are represented in FIG. 3 as the electric motors by which they are driven.)

The twelve joints are: joints 10R, 10L (R and L indicating the right and left sides) each for swiveling the corresponding leg around the gravity axis (z or vertical axis) of the hip, joints 12R, 12L each for rotation around the roll axis (x axis) of the hip, joints 14R, 14L each for rotation around the pitch axis (y axis) of the hip, joints 16R, 16L each for rotation around the pitch axis (y axis) of the knee, joints 18R, 18L each for rotation around the pitch axis (y axis) of the ankle, and joints 20R, 20L each for rotation around the roll axis (x axis) of the ankle. Feet (foot members) 22R, 22L are attached at the lower ends of the leg links 2.

Thus each leg link 2 comprises the hip (crotch) joints 10R(L), 12R(L) and 14R(L), knee joint 16R(L) and ankle joints 18R(L) and 20R(L). The hip and knee joints are connected by a thigh link 24R(L) and the knee and ankle joints by a shank (crus) link 26R (L).

Figure 3:
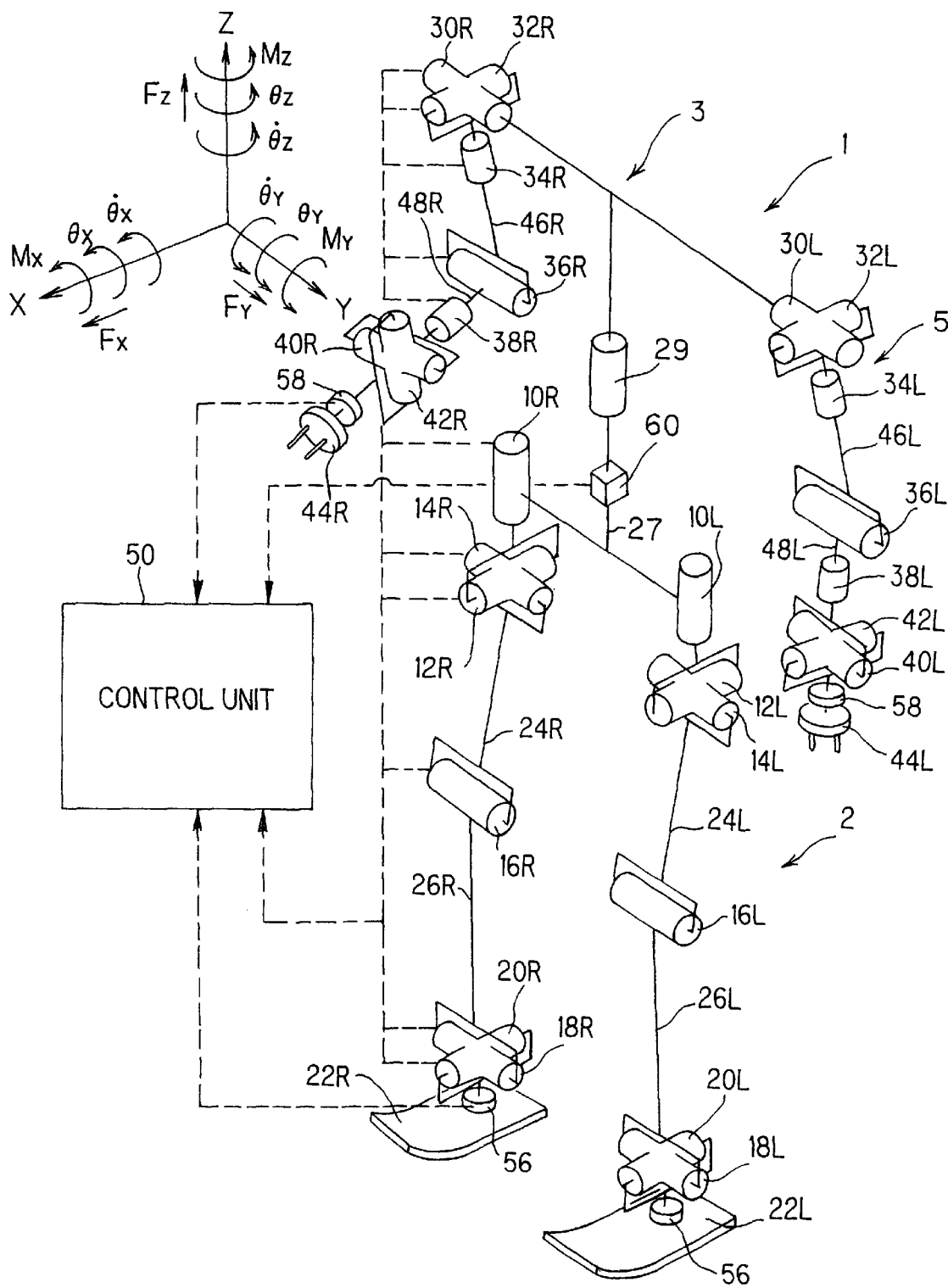
FIG. 3 is a skeleton view of the robot illustrated in FIG. 1 showing the internal structure of the same.

The leg links 2 are connected through the hip joints to the body 3, which is represented in FIG. 3 simply by a body link 27. The arm links 5 are connected to the body 3, as already mentioned. A joint 29 is provided for swiveling of the body around the gravity axis (z axis).

The arm links 5 comprise joints 30R, 30L each for rotation around the pitch axis of the corresponding shoulder, joints 32R, 32L each for rotation around the roll axis of the shoulder, joints 34R, 34L each for swiveling the arm around the gravity axis, joints 36R, 36L each for rotation around the pitch axis of the elbow, joints 38R, 38L each for swiveling the wrist around the gravity axis, joints 40R, 40L each for rotation of the wrist around the pitch axis, and joints 42R, 42L each for rotation of the wrist around the roll axis. Hands (end effectors) 44R, 44L are attached to the distal ends of the wrists.

Thus each arm link 5 comprises the shoulder joints 30R(L), 32R(L) and 34R(L), and the wrist joints 38R(L), 40R(L) and 42R(L). The shoulder joint and the elbow joint are connected by an arm link 46R(L) and the elbow joint and the wrist joint are connected by a forearm link 48R(L).

Owing to the foregoing configuration, the leg links 2 of the right and left legs 2R(L) thus have twelve degrees of freedom in total, so that during locomotion the legs as a whole can be caused to execute the desired movements by driving the 6*2=12 joints to appropriate angles. (The symbol * indicates multiplication in this specification). The robot is thus capable of walking freely within three-dimensional space. Each arm link 5 has seven degrees of freedom. The robot 1 can therefore be operated to carry out desired jobs by driving these joints to appropriate angles.

As shown in FIG. 3, a force sensor 56 of conventional design is mounted on the feet 22R(L) below the ankle joint. Of the external forces acting on the robot, the force sensor 56 detects the three floor reaction force components Fx, Fy and Fz and the three moment components Mx, My and Mz acting on the robot in and around three mutually orthogonal axes from the surface of contact.

Further, a similar force sensor 58 is mounted between the wrist joint and the hand 44R(L). The force sensor 58 detects other forces acting on the robot, particularly the three object reaction force components Fx, Fy and Fz and the three moment components Mx, My and Mz acting on the robot in and around three mutually orthogonal axes from the work (object the robot is performing an operation on).

An inclination sensor 60 mounted on the body 3 detects inclination and angular velocity relative to the z axis (vertical axis or gravity axis). The outputs of the joint motors are decreased in angular velocity and increased in torque by reduction gears (not shown) and applied for moving the links 24R(L), 26R(L) etc. relative to one another. Each motor is provided with an encoder (not shown) for detecting the amount of motor rotation.

The control unit (designated by reference numeral 50) accommodated in the housing unit 6 as mentioned earlier has a microcomputer. The outputs of the force sensors 56 etc. are forwarded to the control unit 50. (For simplicity of illustration, only the outputs from the right side of the robot 1 are indicated in FIG. 3.)

Figure 4:
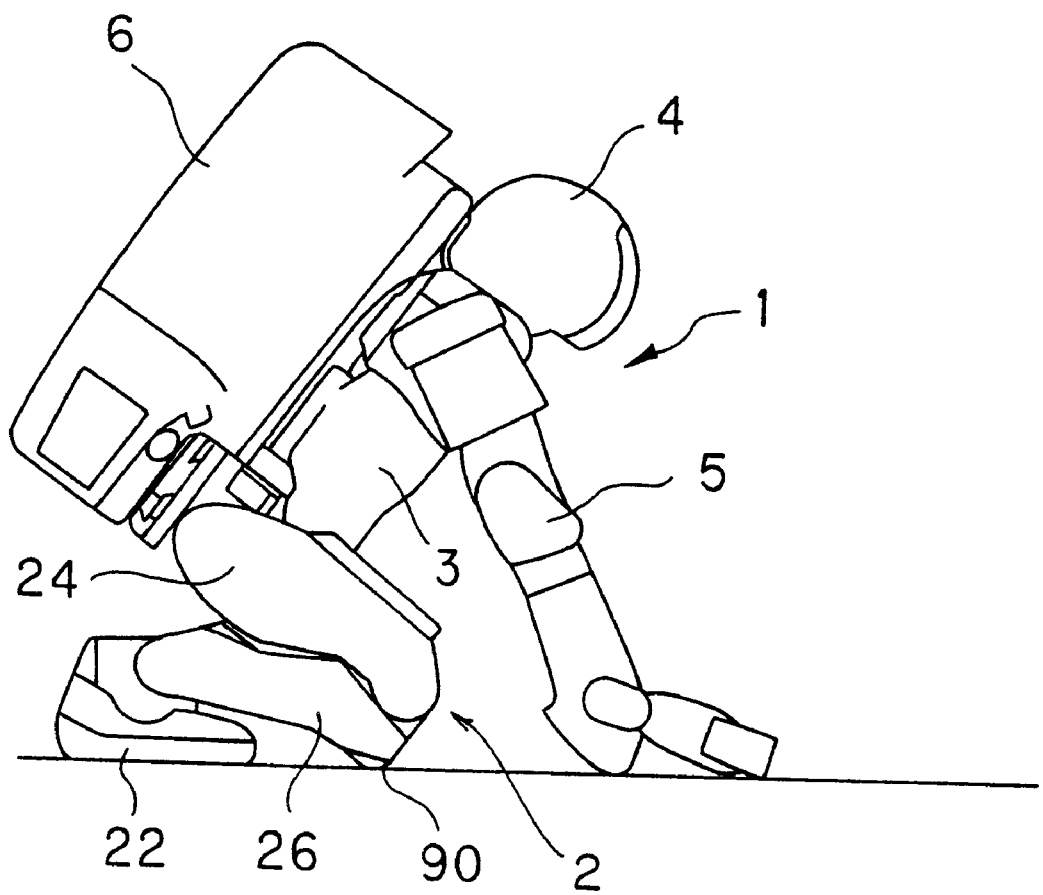
FIG. 4 is a side view of the robot illustrated in FIG. 1 showing an example of attitude the robot can assume with portions near the knee joints in contact with a floor.

Based on data stored in a memory (not shown) and the detection values, the control unit 50 computes the joint driving manipulated variables and drives the joints. By this, the robot can be made to assume an attitude, such as that shown in FIG. 4 by way of example, with portions near the knee joints 16 in contact with the floor.

Figure 5:
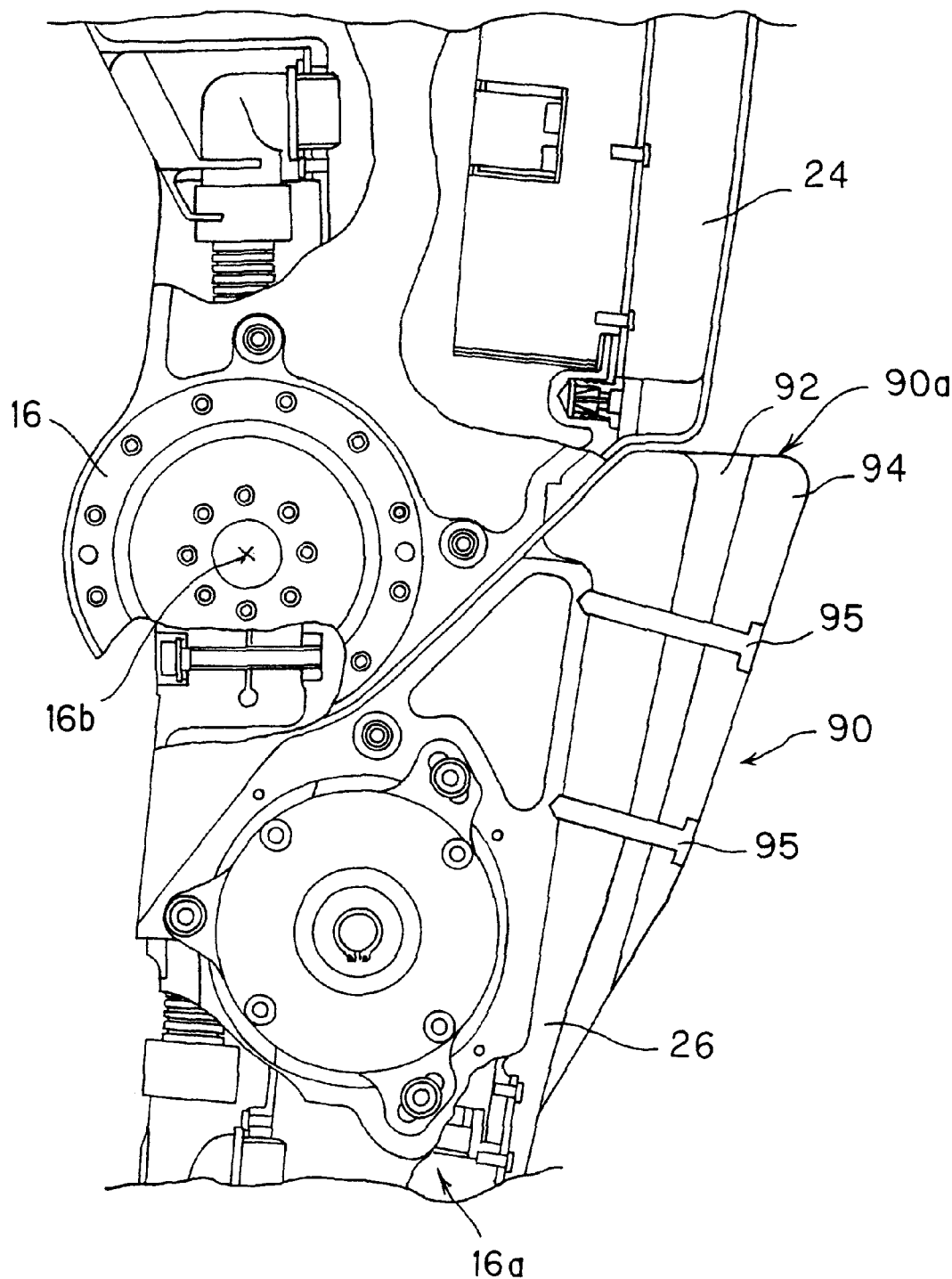
FIG. 5 is a sectional view of regions of the knee joints of the robot illustrated in FIG. 1.
Figure 6:
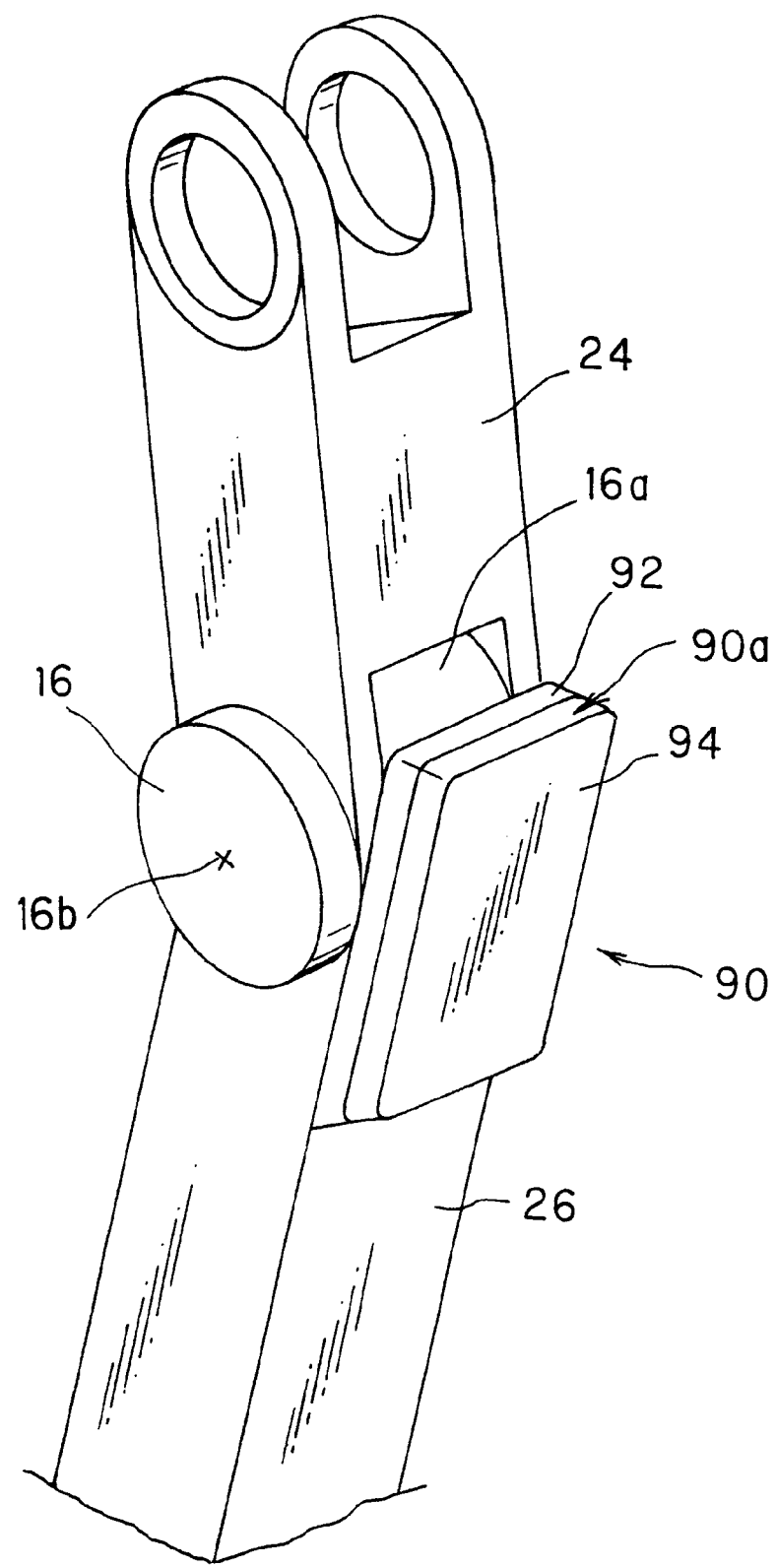
FIG. 6 is a view schematically showing the structure of the regions of the knee joint of the robot 1 illustrated in FIG. 1.
Figure 7:
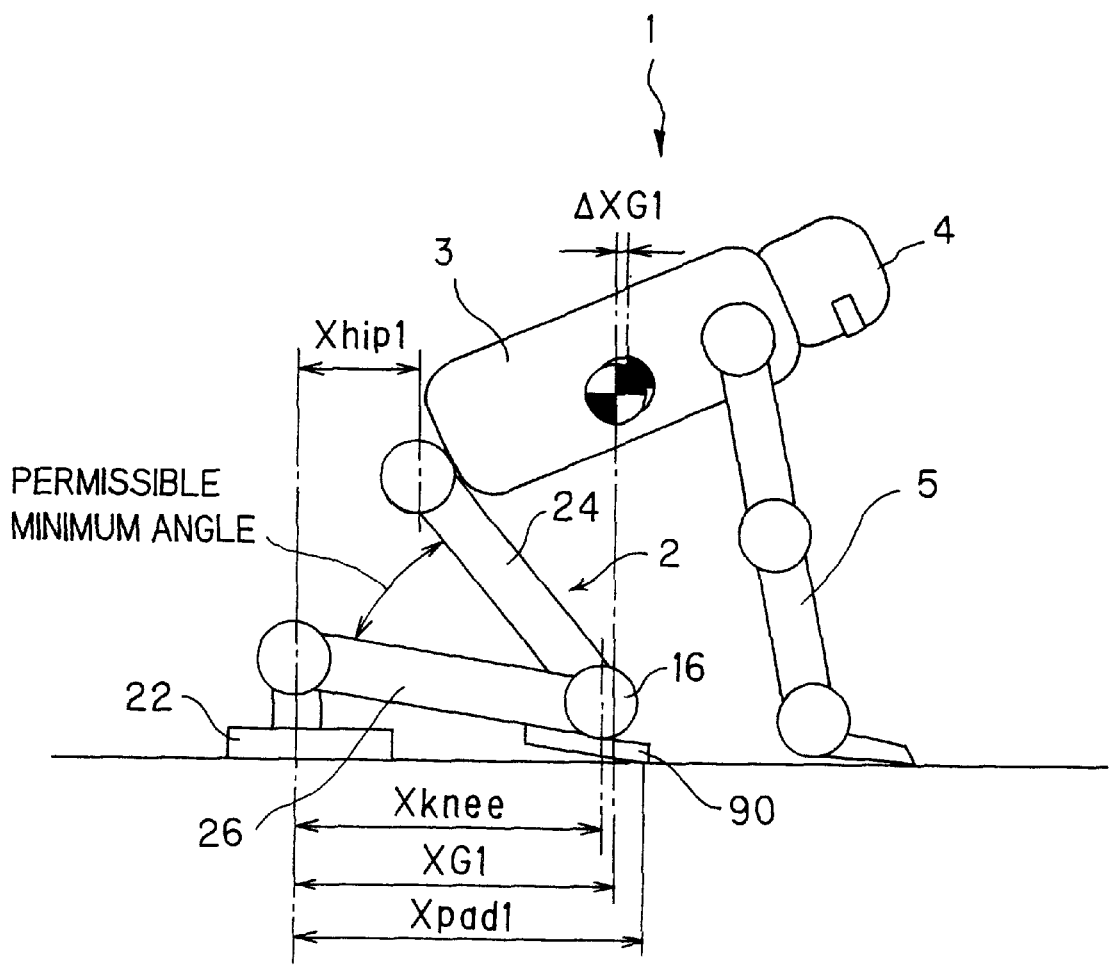
FIG. 7 is a view schematically showing movements of the robot illustrated in FIG. 1 in the course of standing.

The structure around the knee joints 16 will now be explained in further detail with reference to FIGS. 5 to 7. FIG. 5 is a sectional view of the region of the knee joints 16. FIG. 6 is a view schematically illustrating the structure of the knee joints 16. FIG. 7 is a view for schematically explaining movements of the robot 1 in the course of standing.

In this embodiment, as shown in FIG. 5, a knee pad (landing and shock absorbing means) 90 is provided in the vicinity of the knee joints 16 (more precisely, in the vicinity of a knee joint housing 16a, which portion is referred to hereinafter as the "knee region"). When the knee region is landing on the floor, the knee pad meets the floor first. The knee pad 90 makes the knee region to be positioned at a location forward of the center of gravity of the robot 1 in the direction of robot advance and absorbs the impact occurring when the knee region is making contact with (landing on) the floor.

The knee pad 90 is, for example, constituted in a two-layer structure of an elastic or soft member 94 made of rubber or other elastic or soft material overlaid on the outer surface of a rigid or hard member 92 made of iron or the like. It is mounted on the shnak link 26 so as to project toward the thigh link 24 at the surface (outside) of the knee region.

The knee pad 90 is fastened to the shank link 26 by appropriate fastening means such as bolts 95 so as to project toward the body side at least beyond the axis of rotation 16b of the knee joint 16. More specifically, the knee pad 90 is mounted on the shank link 26 so that its upper end 90a reaches beyond the axis of rotation 16b of the knee joint 16 in the gravity axis direction (z axis direction) when the robot 1 stands upright as shown in FIG. 1. As the knee pad 90 is mounted on the shank link 26, which is nearer to the terminal end, it can be more easily attached than if it were mounted on the thigh link 24.

In the state shown in FIG. 7, when touchdown (landing) is being attempted at a point above the knee region, the knee pad 90 makes contact with the floor because it projects in the direction of advance. The point at which the knee pad comes into contact with the floor, hereinafter referred to as knee pad floor contact point Xpad1, is therefore located further forward than the knee floor contact point Xknee in the case of the prior art robot illustrated in FIG. 19, and hence Xpad1>Xknee.

Figure 19A:
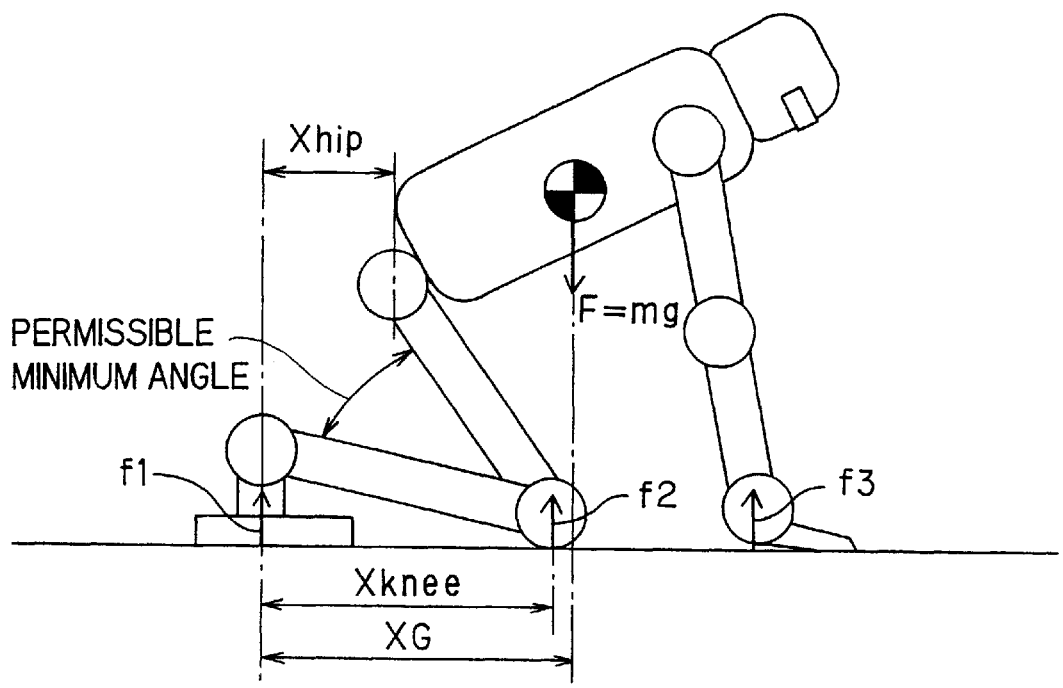
FIGS. 19A and 19B is a set of explanatory views schematically showing movements of a prior art robot in the course of standing.
Figure 19B:
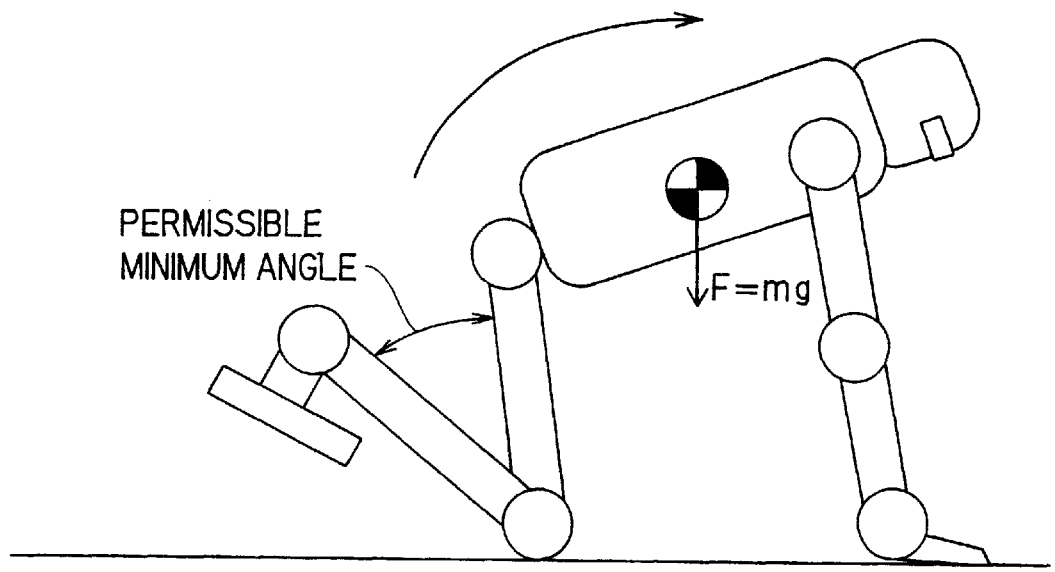

Moreover, in this attitude the heights of hip joints 10R(L), 12R(L) and 14R(L) are raised in the gravity axis direction owing to the thickness of the knee pad 90 so that the hip position Xhip1 is shifted rearward from the hip position Xhip in the case of the prior art robot illustrated in FIG. 19. As a result, the robot's center of gravity XG is shifted rearward by ΔXG1 to the position XG1 (ΔXG1=XG1−XG1).

Thus when operations are effected to restore the robot 1 to a standing attitude, i.e., when the arm links 5 are extended to maximum length, the knee joints 16 are bent to the limit and the thigh links 24 and shank links 26 are driven to the permissible minimum angle therebetween, the center of gravity XG1 of the robot 1 can be brought rearward of the knee pad floor contact point Xpad1 (as XG1<Xpad1). In other words, the knee joint 16 is to be positioned at a location (corresponding to Xpad1) forward of the center of gravity of the robot (XG1) in a direction of robot advance.

The robot 1 can therefore be easily stood up from an attitude with its knee region in contact with the floor, i.e., from a kneeling attitude. Moreover, in making knee-first contact with a floor, the knee pads 90 absorb the impact of the contact, thereby protecting both the knee regions and the floor from damage.

Figure 8:
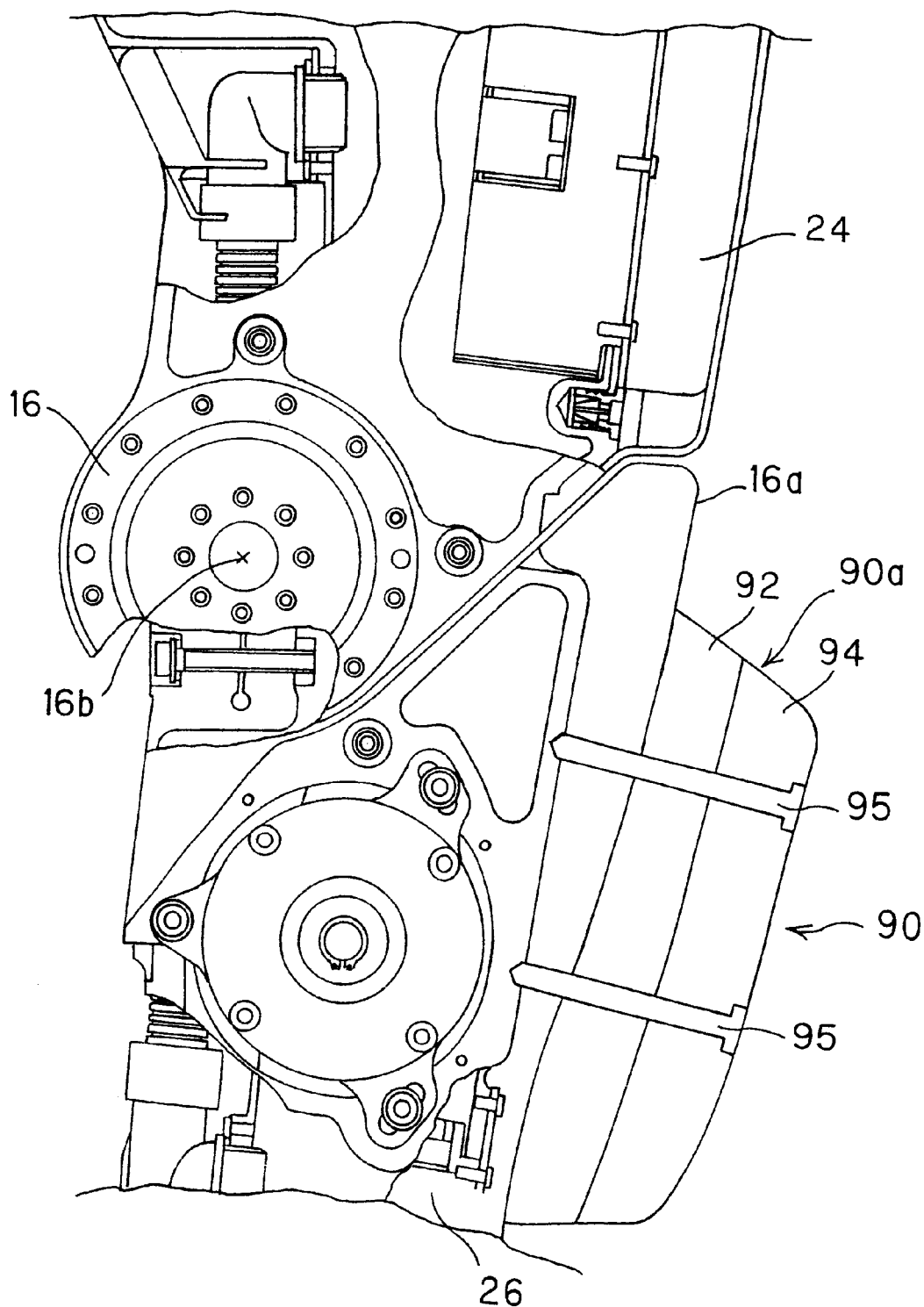
FIG. 8 is a view, similar to FIG. 5, but showing the regions of the knee joint of a legged walking robot according to a second embodiment of the invention.
Figure 9:
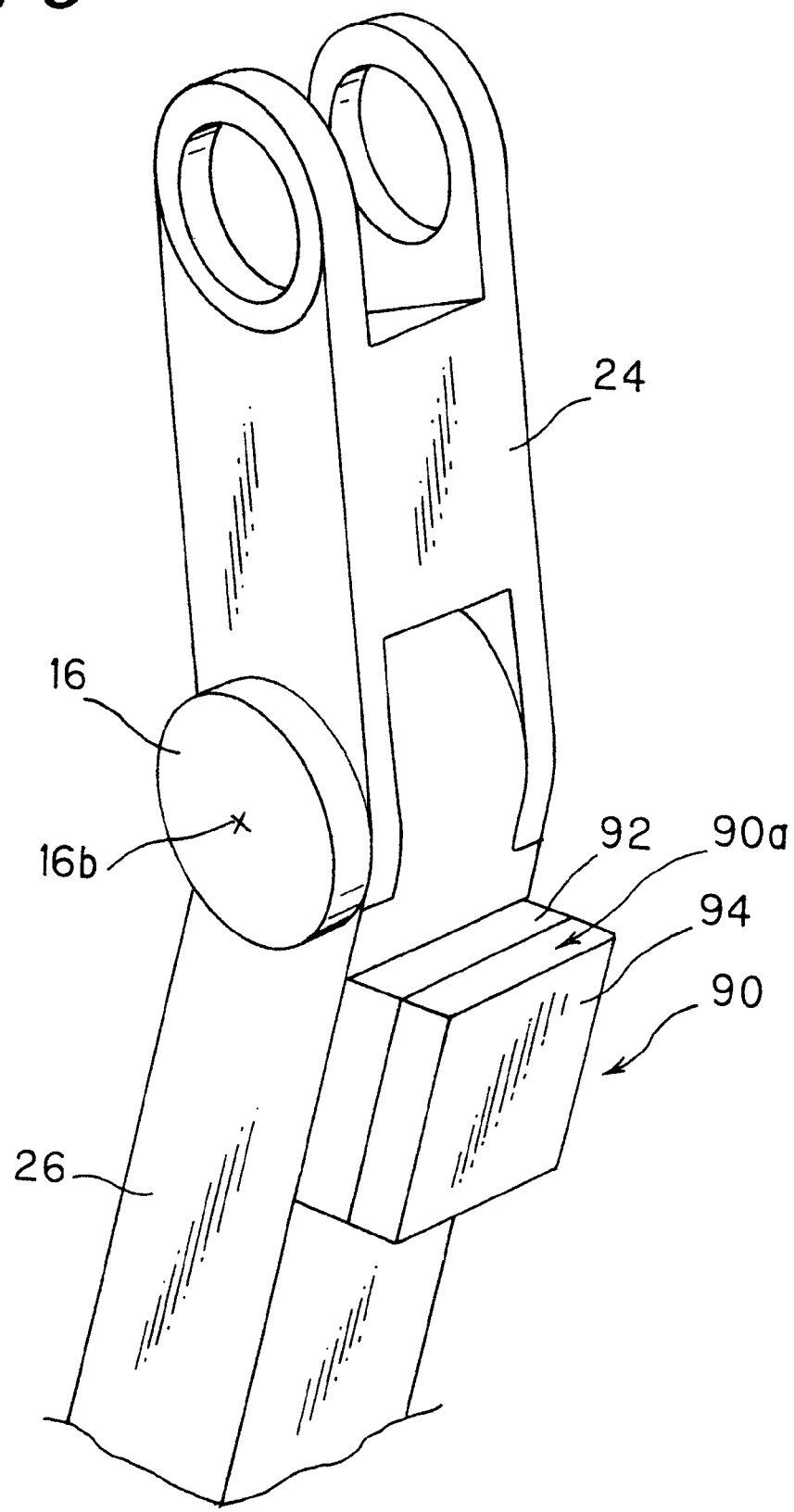
FIG. 9 is a view, similar to FIG. 6, but schematically showing the regions of the knee joint of the robot according to the second embodiment of the invention.
Figure 10:
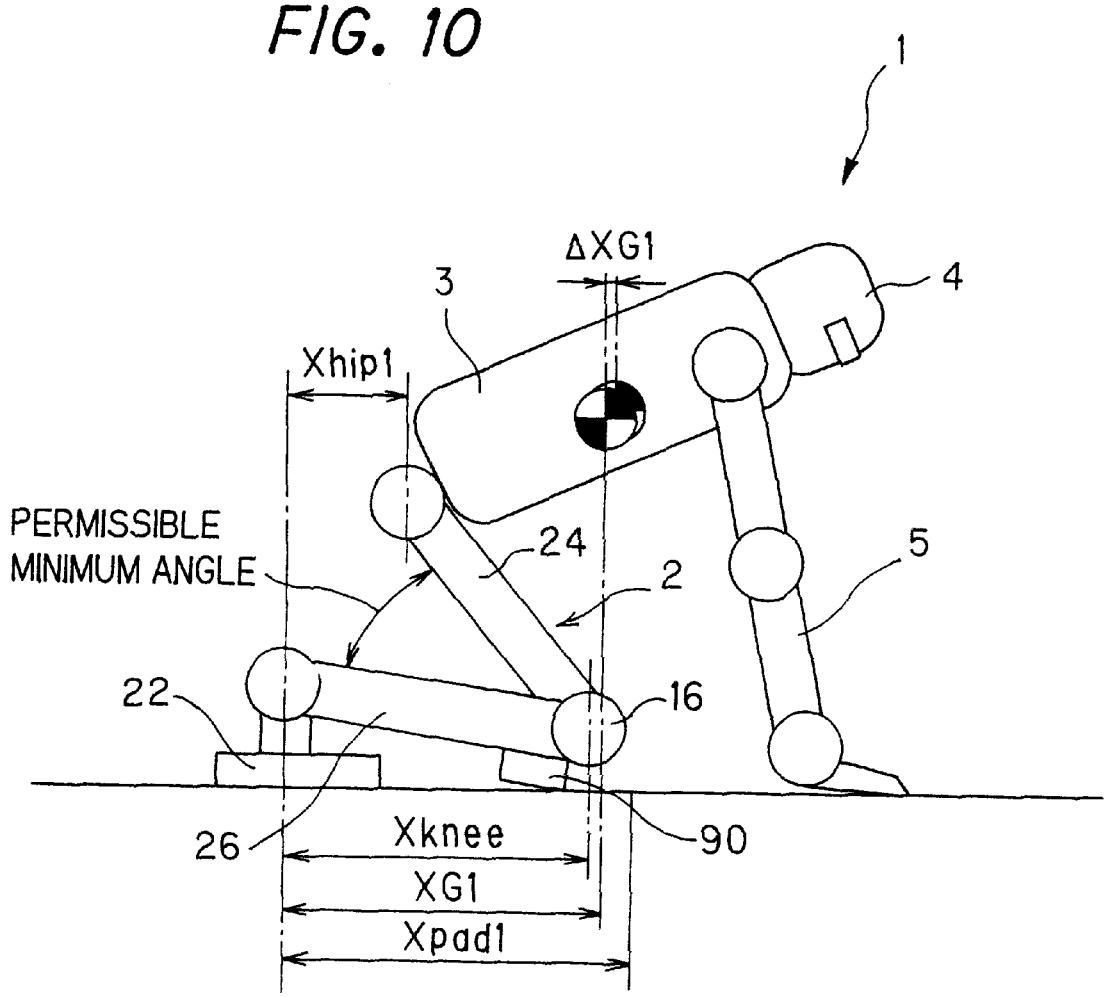
FIG. 10 is a view, similar to FIG. 7, but schematically showing movements of the robot according to the second embodiment of the invention.

FIGS. 8 to 10 show a legged walking robot according to a second embodiment of the present invention, with particular focus on the structure in the vicinity of the knee region. Members common with those of the first embodiment are assigned like reference symbols and will not be explained again.

Points of difference relative to the first embodiment will be explained. In the second embodiment, the knee pad 90 is formed thicker than in the first embodiment and is made shorter in the gravity axis direction. Owing to the shorter length, the upper end 90a is located on the shank link 26 at a position beneath the axis of rotation 16b of the knee joint 16. In other words, the knee pad 90 is mounted on the shank link 26 to project outwardly (from the knee joint 16R, L) such that the knee region is to be positioned at a location forward of the center of gravity of the robot 1 in the direction of robot advance when coming into the knee-first contact with the floor.

As shown in FIG. 10, this configuration provides the same effects and advantages as those obtained with the first embodiment. The second embodiment is otherwise the same as the first, regarding structure, effects and advantages.

Figure 11:
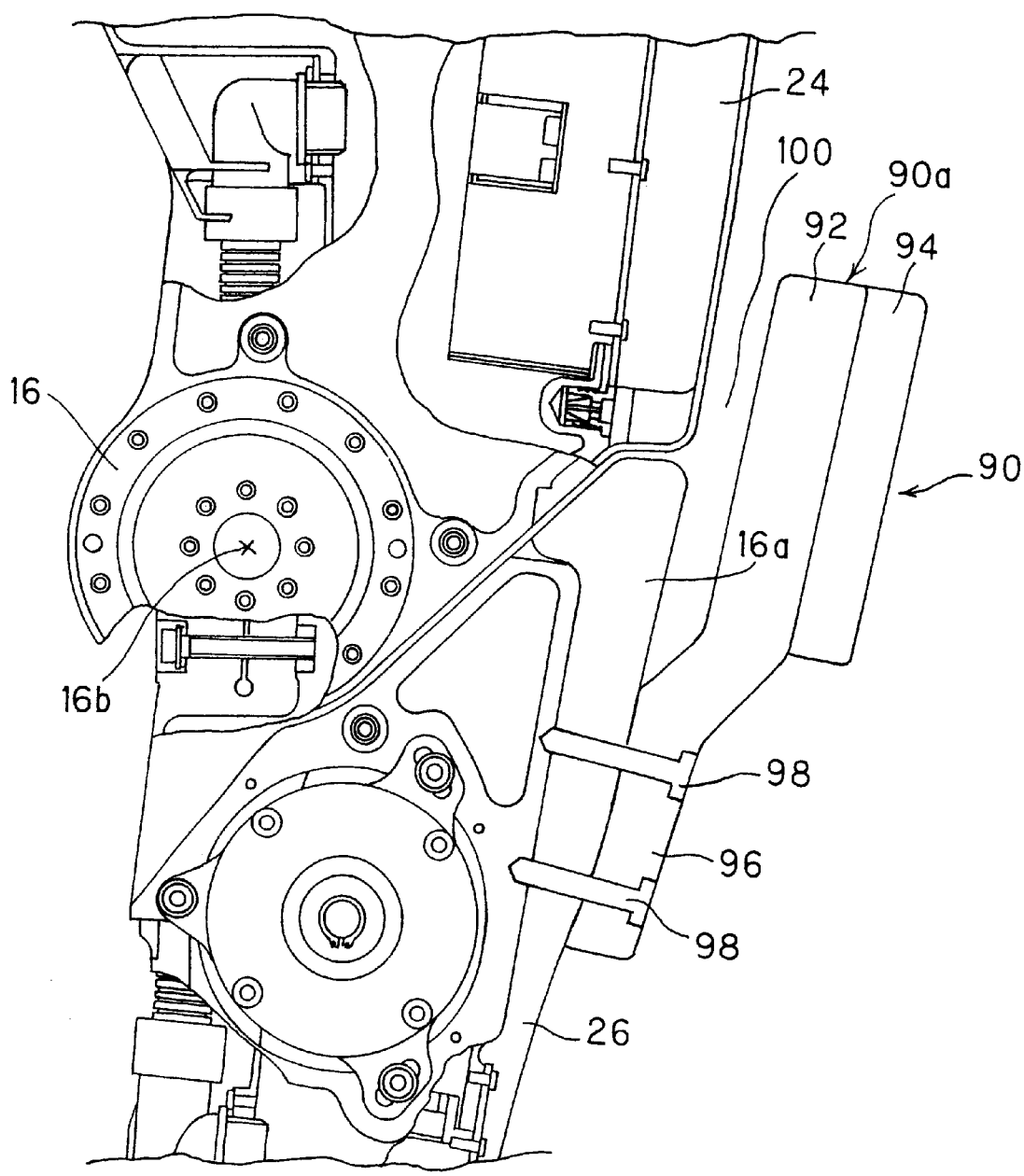
FIG. 11 is a view, similar to FIG. 5, but showing the regions of the knee joint of a legged walking robot according to a third embodiment of the invention.
Figure 12:
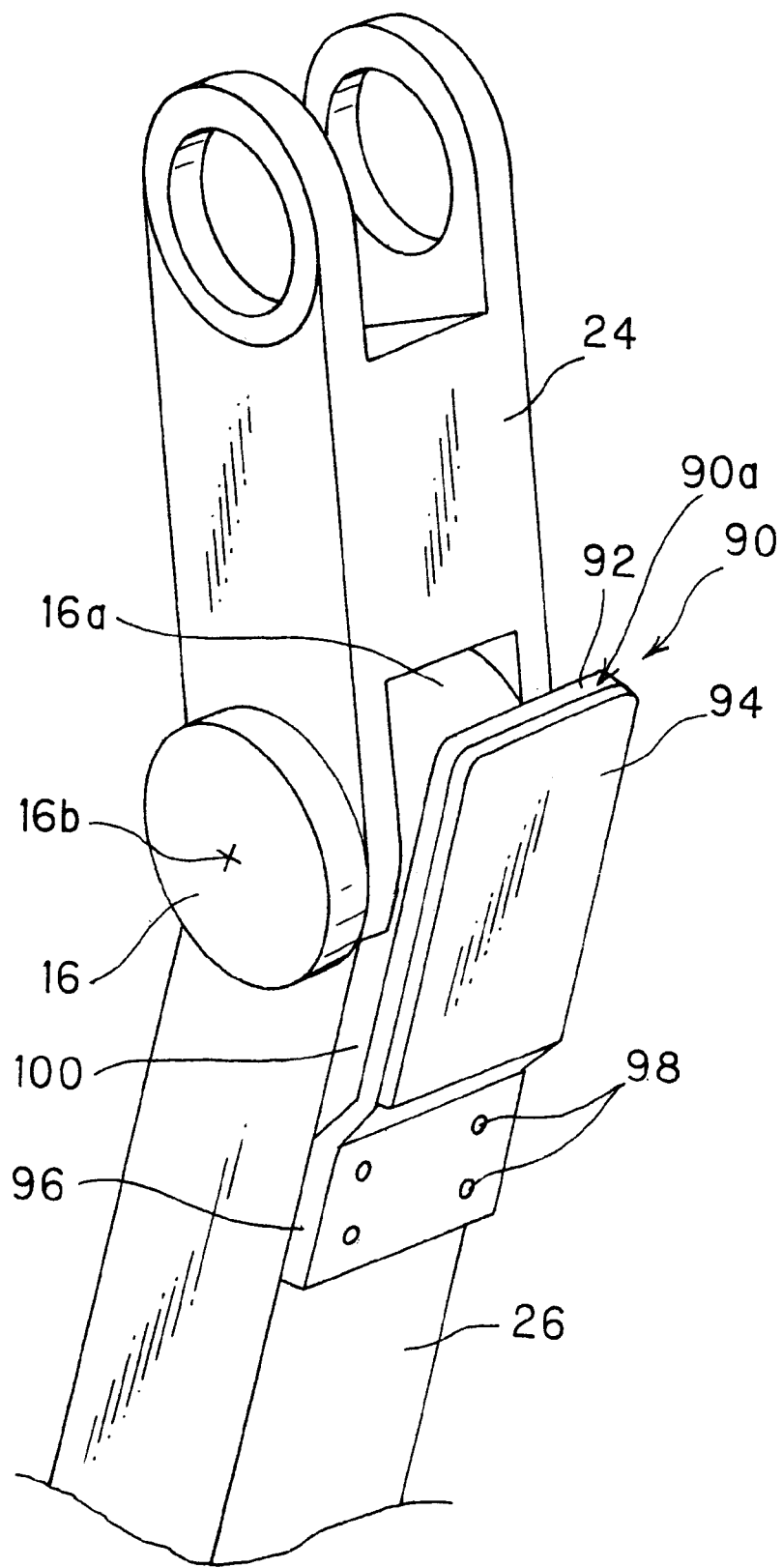
FIG. 12 is a view, similar to FIG. 6, but schematically showing the regions of the knee joint of the robot according to the third embodiment of the invention.

FIGS. 11 to 12 show a legged walking robot according to a third embodiment of the present invention, with particular focus on the structure in the vicinity of the knee region. Members common with those of the first embodiment are assigned like reference symbols and will not be explained again.

In the third embodiment, the rigid or hard member 92 of the knee pad 90 is elongated to form a stay 96. The knee pad 90 is mounted by fastening the stay 96 to the shank link 26 using bolts 98. More specifically, the rigid or hard member 92 is cantilevered to the shank link 26 such that a free end of the rigid or hard member 92 of the knee pad 90 is disposed at a location spaced apart outwardly from the knee region. A space 100 is left between the knee pad 90 and the knee region, more precisely between the knee pad 90 and the knee joint housing 16a. The knee pad 90 is thus disposed at a location spaced outwardly. The rigid or hard member 92 is fabricated of a material having some degree of elasticity.

This configuration enables the robot 1 to be easily stood up after falling down. In addition, the shock acting on the knee pad 90 is even more effectively absorbed than in the first and second embodiments because the rigid or hard member 92 displaces toward the knee joint housing 16a within the space 100 to disperse some of the shock to the shank link 26. The third embodiment is otherwise the same as the first, regarding structure, effects and advantages.

Figure 13:
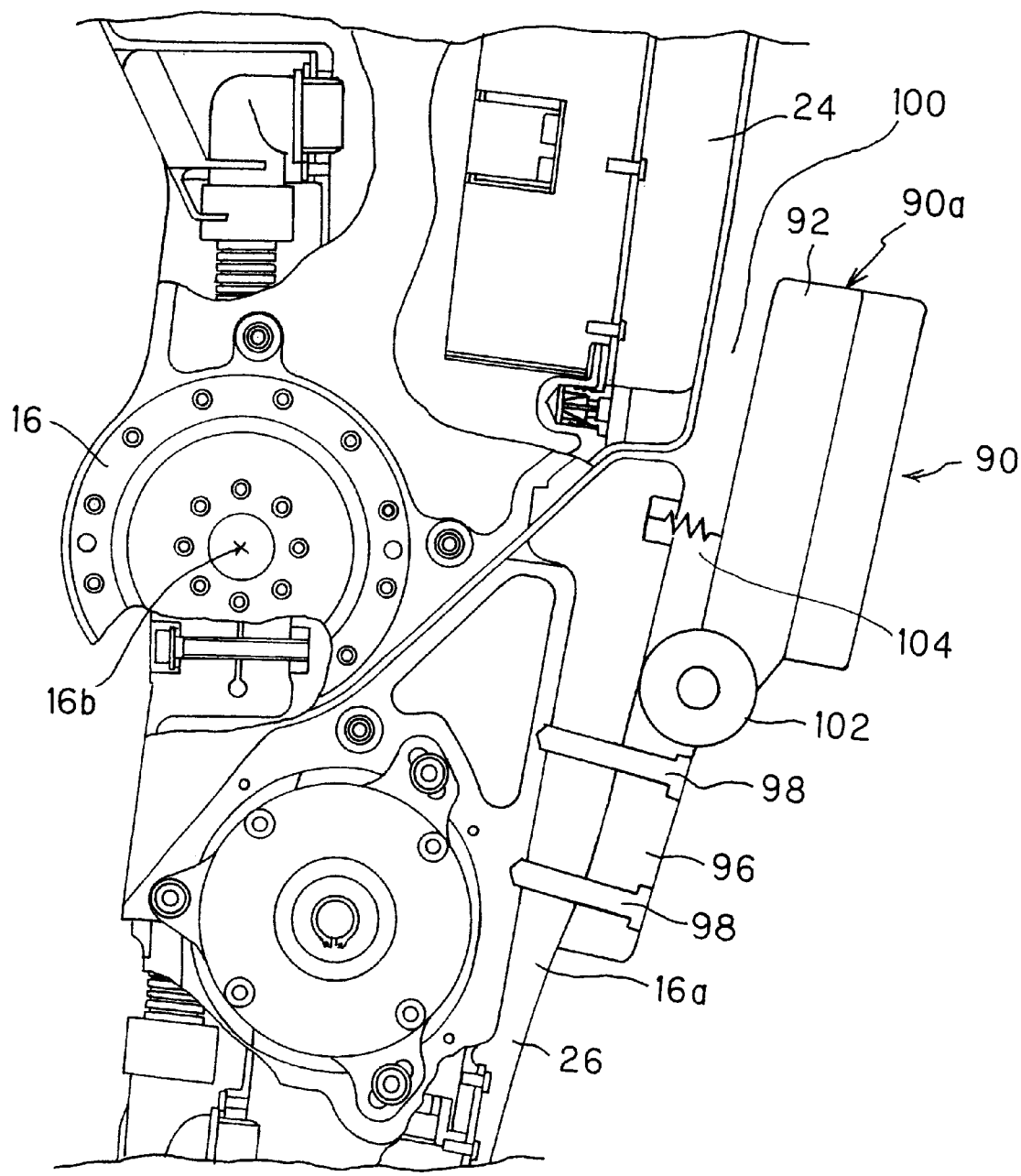
FIG. 13 is a view, similar to FIG. 5, but showing the regions of the knee joint of a legged walking robot according to a fourth embodiment of the invention.
Figure 14:
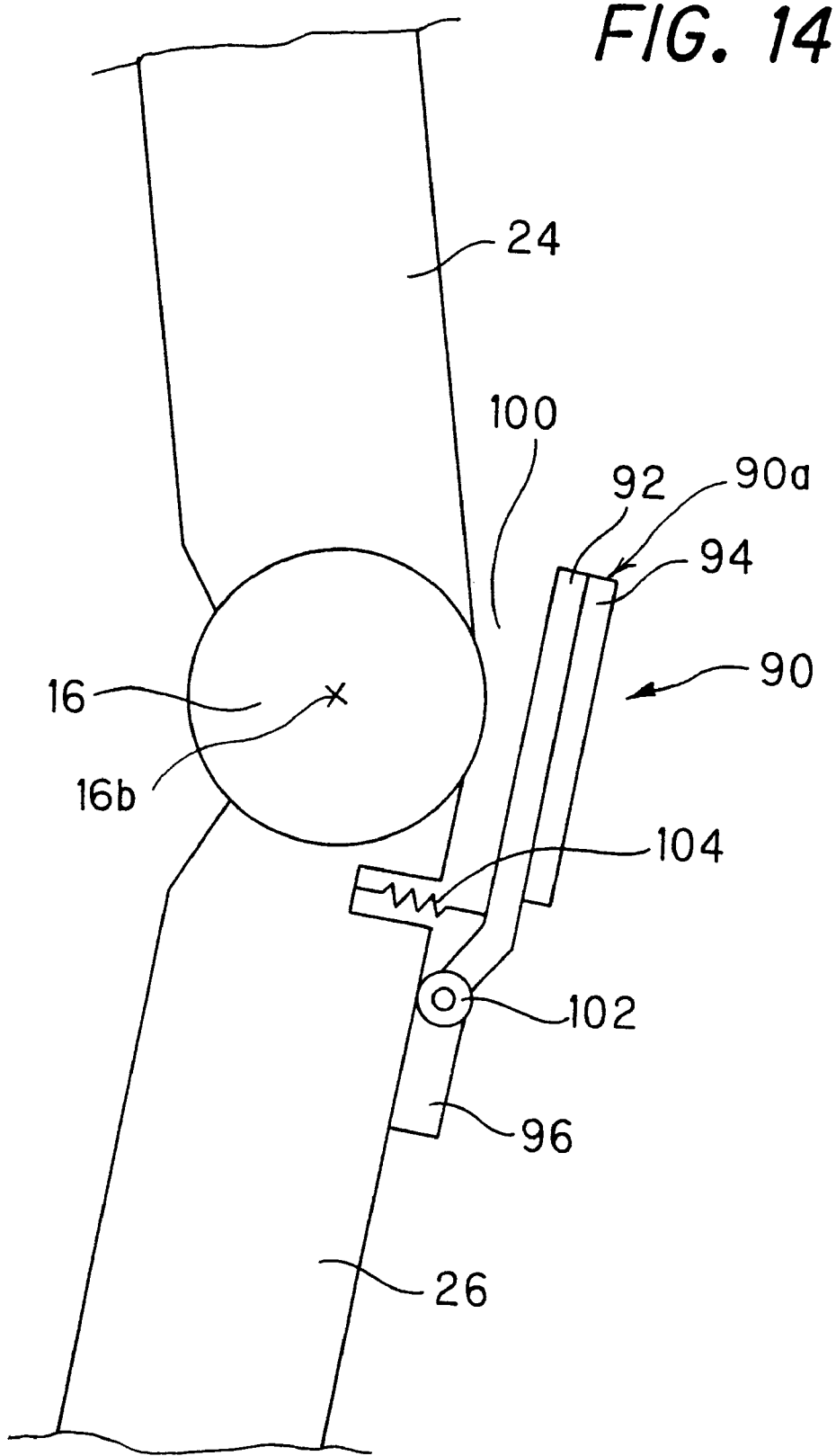
FIG. 14 is a view, similar to FIG. 6, but schematically showing the regions of the knee joint of the robot according to the fourth embodiment of the invention.
Figure 15:
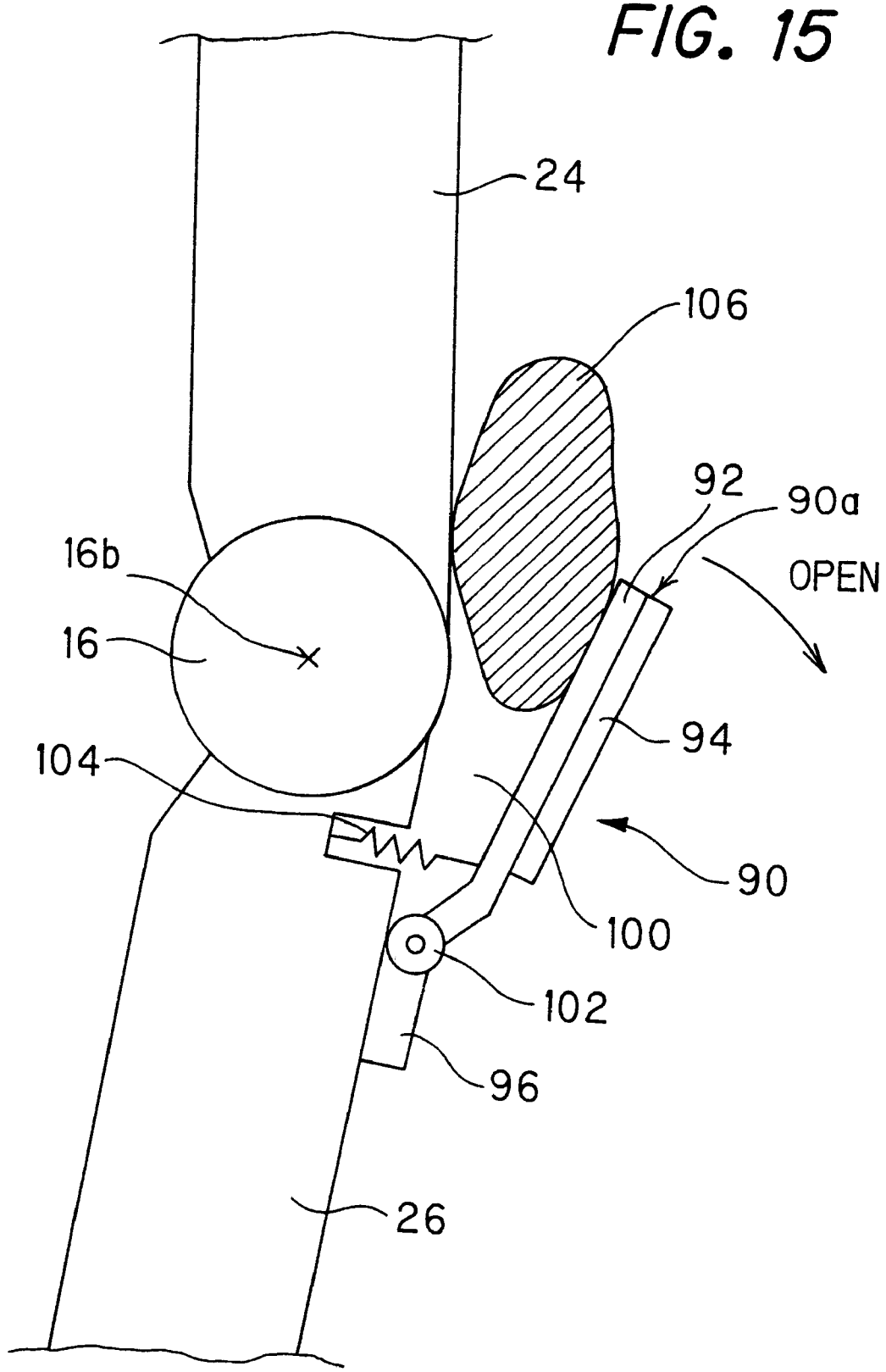
FIG. 15 is a side view, but schematically showing the regions of the knee joint and foreign matter contained within of the robot according to the fourth embodiment of the invention.

FIGS. 13 to 15 show a legged walking robot according to a fourth embodiment of the present invention, with particular focus on the structure in the vicinity of the knee region. Members common with those of the first embodiment are assigned like reference symbols and will not be explained again.

As illustrated, in the fourth embodiment the knee pad 90 is attached to the stay 96 through a hinge 102. The knee pad 90 can therefore swing relative to the stay 96. Further, an urging means 104 such as a spring or other such elastic member is interposed between the rigid or hard member 92 and the knee region, more precisely between the rigid or hard member 92 and the knee joint housing 16a. The knee pad 90 is therefore urged outwardly (i.e., to a location spaced outwardly).

In addition to providing the same effects and advantages as those obtained with the first embodiment, this configuration further enables easy removal of a foreign object 106 that happens to get caught in the space 100 as shown in FIG. 15. The operator can also easily free a hand or finger that gets caught in the space 100. The fourth embodiment is otherwise the same as the first, regarding structure, effects and advantages.

Figure 16:
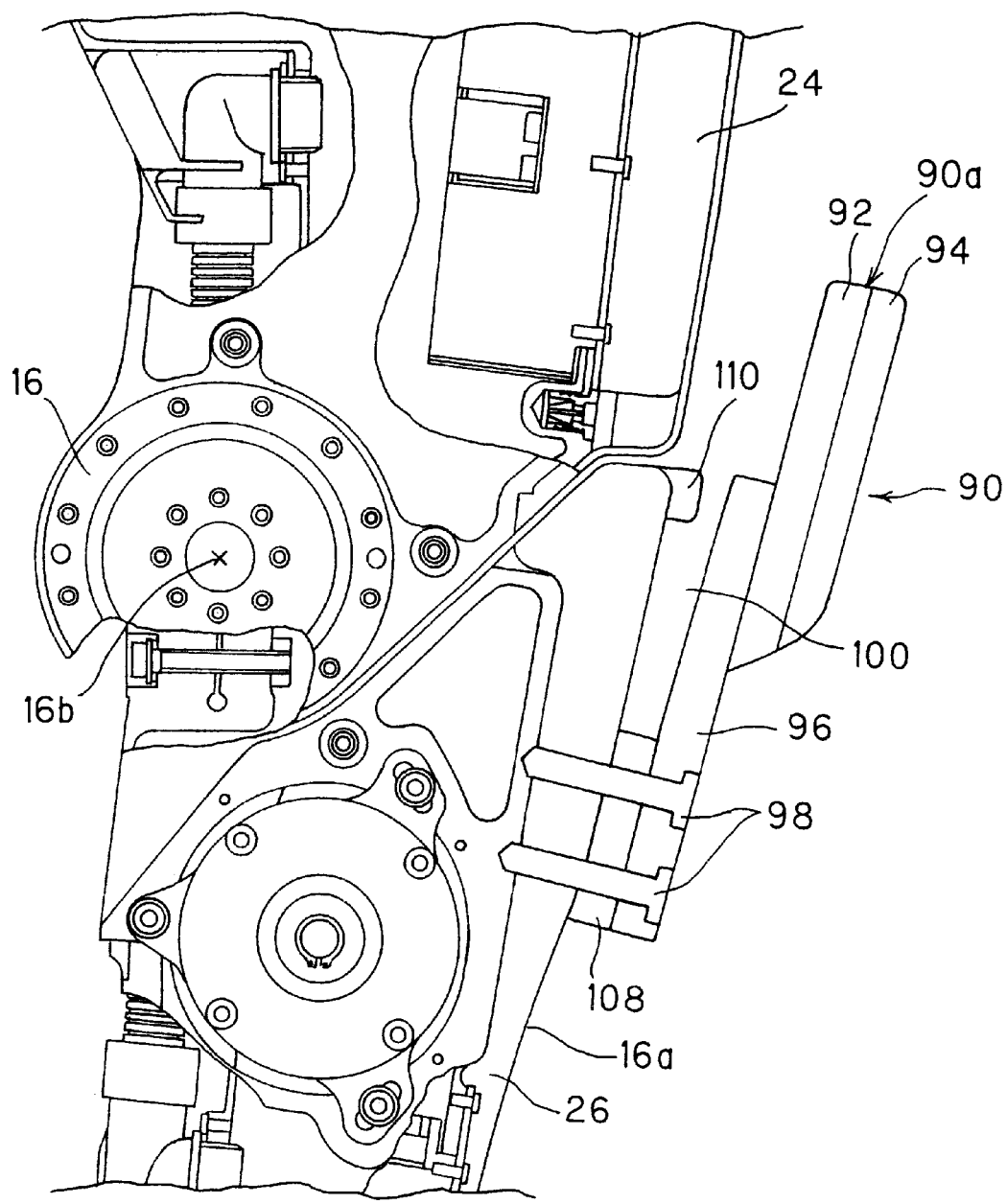
FIG. 16 is a view, similar to FIG. 5, but showing the regions of the knee joint of a legged walking robot according to a fifth embodiment of the invention.
Figure 17:
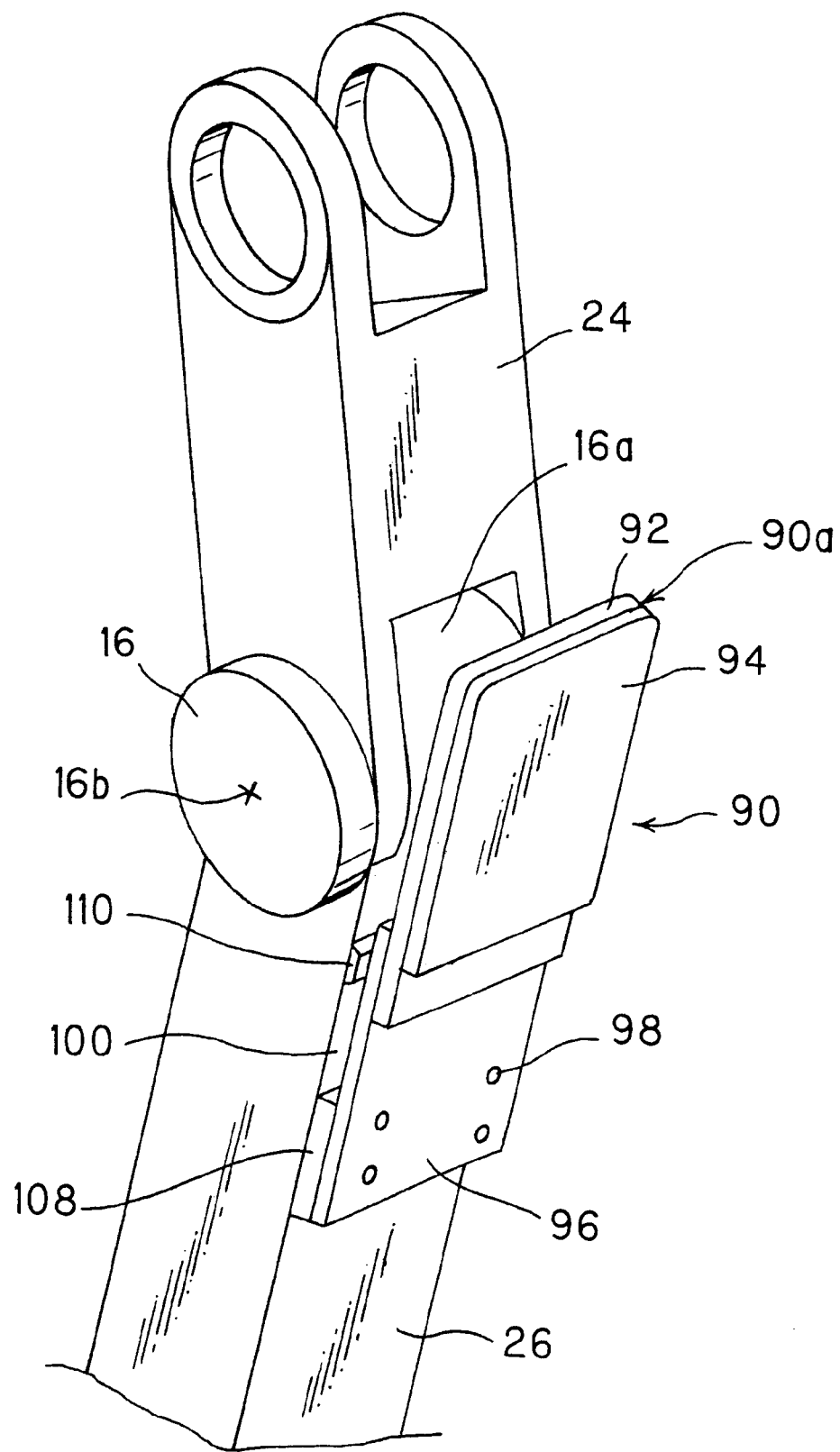
FIG. 17 is a view, similar to FIG. 6, but schematically showing the regions of the knee joint of the robot according to the fifth embodiment of the invention.
Figure 18:
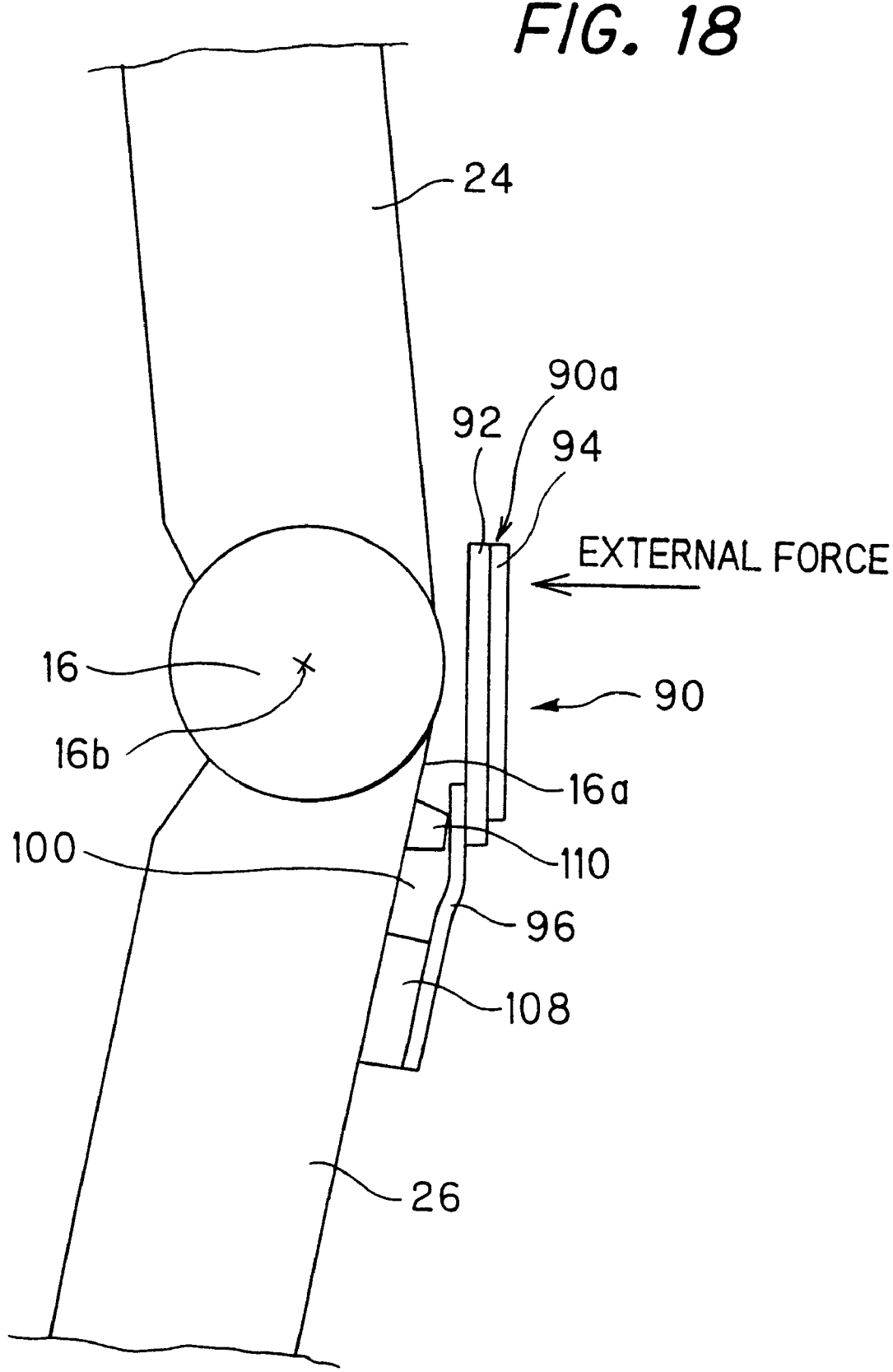
FIG. 18 is a side view, similar to FIG. 15, but schematically showing the regions of the knee joint of the robot and an external force applied therewith according to the fifth embodiment of the invention.

FIGS. 16 to 18 show a legged walking robot according to a fifth embodiment of the present invention, with particular focus on the structure in the vicinity of the knee region. Members common with those of the first embodiment are assigned like reference symbols and will not be explained again.

In the fifth embodiment, the stay 96 supporting the knee pad 90 is made of an elastic member (a flat spring, for instance) and is fastened to the shank link 26 through a mount 108. A space 100 is formed between the stay 96 and the knee joint housing 16a, and a stop 110 is disposed therein.

The configuration is similar to that of the third embodiment in that the space 100 is formed between the knee pad 90 and the knee joint housing 16a. However, the third embodiment, while achieving a marked improvement in shock absorbing effects, may not be able to absorb shock sufficiently if the space is too small or the impact force is large.

With the configuration of the fifth embodiment, on the other hand, even if the knee pad 90 is bowed inward by an external force when the robot falls down, for example, the stay 96 will deform as shown in FIG. 18 to enable thorough absorption of the external force (impact force). The fifth embodiment is otherwise the same as the first, regarding structure, effects and advantages.

Having been configured in the foregoing manner, the embodiments are configured to provide a legged walking robot (1) having at least a body (3) and a plurality of articulated legs (2) each connected to the body through hip joints (10R, L, 12R, L, 14R, L) and having a knee joint (16R, L) and ankle joints (18R, L, 20R, L), characterized in that a landing/shock absorbing means (knee pad 90) is mounted at a position adjacent to the knee joint (16) which is brought into contact with a floor when coming into knee-first contact with the floor such that the knee joint is to be positioned at a location (Xpad1) forward of the center of gravity of the robot (XG1) in a direction of robot advance, while absorbing impact occurring from the contact with the floor.

The legged walking robot is equipped with landing/shock absorbing means that make contact with the floor when the robot makes knee-first contact with the floor. As this configuration enables the knee regions to be positioned forward of the robot's center of gravity, more precisely forward of the robot's center of gravity relative to the direction of robot advance, the robot can be easily stood up from an attitude with its knee regions in contact with the floor, i.e., from a kneeling attitude. Moreover, when the legged walking robot makes knee-first contact with the floor, the impact of the contact is absorbed to protect both the knee regions and the floor from damage.

In the legged walking robot, the hip joints (10R, L, 12R, L, 14R, L) and the knee joint (16R, L) are connected by a thigh link (24R, L) and the knee joint (16R, L) and the ankle joint (18R, L, 20R, L) are connected by a shank link (26R, L), and the landing /shock absorbing means (90) is mounted on the shank link (26R, L) to protect the knee joint (16R, L). The legged walking robot is equipped with landing/shock-absorbing means attached to the shank links (26R, L) so as to protect the knee regions. This, therefore, not only provides the effects and advantages mentioned above but also makes the shock-absorbing means easier to attach because they are located nearer to the terminal ends.

In the legged walking robot, the landing/shock absorbing means (90) is on the shank link (26R, L) to project toward the body (3) in such a way that an upper end (90a) of the landing/shock absorbing means (90) reaches beyond an axis of rotation of the knee joint (16b) in a direction of gravity axis (z-axis) when the robot stands upright such that the knee joint (16R, L) is to be positioned at a location forward of the center of gravity of the robot (1) in the direction of robot advance when coming into the knee-first contact with the floor.

In the legged walking robot, the landing/shock absorbing means (90) is mounted on the shank link (26R, L) to project outwardly from the knee joint (16R, L) such that the knee joint (16R, L) is to be positioned at a location forward of the center of gravity of the robot (1) in the direction of robot advance when coming into the knee-first contact with the floor.

In the legged walking robot, the landing/shock absorbing means (90) is disposed at a location spaced outwardly from the knee joint (16R, L). The legged walking robot is equipped with landing/shock absorbing means that are supported at locations spaced outwardly from the knee regions. Shock absorption and protection of the knee regions and the floor at the time of landing is therefore further enhanced.

In the legged walking robot, the landing/shock absorbing means (90) is urged to be spaced outwardly from the knee joint (16R, L). The legged walking robot is equipped with shock-absorbing means that are urged to locations spaced outwardly from the knee regions. This, therefore, not only provides the effects mentioned above but also facilitates removal/freeing of any foreign object, finger or hand that may get caught in the space between a shock-absorbing member and a knee region.

In the legged walking robot, a stop (110) is disposed at the space (100). The legged walking robot is equipped with the landing/shock means having a stop provided inward from the sides facing the knee regions. By cantilevering the landing/shock-absorbing means through an elastic member, for example, the impact of contact when the legged walking robot makes knee-first contact with the floor can be absorbed to protect both the knee regions and the floor from damage.

In the legged walking robot, the landing/shock absorbing means (90) comprises an elastic member (94). The legged walking robot is equipped with landing/shock absorbing means (90) comprising an elastic member (94). When the legged walking robot makes knee-first contact with the floor, shock absorption and protection of the knee regions and the floor at the time of landing is, therefore, further enhanced.

In the legged walking robot, the elastic member (94) is overlaid on a rigid member (92) mounted on the shank link (26R, L).

In the legged walking robot, the landing/shock absorbing means (90) comprises a rigid member (92) mounted on the shank link (26R, L), and the rigid member (92) is cantilevered to the shank link (16R, L) such that a free end of the rigid member (92) is disposed at the location spaced outwardly from the knee joint (16R, L).

In the legged walking robot, an urging means (104) is interposed between the space (100) to urge the free end outwardly.

It should be noted that, although a biped walking robot was taken as an example of a legged walking robot in the foregoing explanation, this is not limitative and the present invention also applies to any of various other types of legged walking robots.

While the invention has thus been shown and described with reference to specific embodiments, it should be noted that the invention is in no way limited to the details of the described arrangements but changes and modifications may be made without departing from the scope of the appended claims.

What is claimed is:

1. A legged walking robot having at least a body and a plurality of articulated legs each connected to the body through a hip joint and having a knee joint and an ankle joint;
   wherein
   the improvement comprises:
      a landing means is mounted at a position adjacent to the knee joint which is brought into contact with a floor when coming into knee-first contact with the floor such that the knee joint is to be positioned at a location forward of the center of gravity of the robot in a direction of robot advance.

2. A legged walking robot according to claim 1, wherein the hip joint and the knee joint are connected by a thigh link and the knee joint and the ankle joint are connected by a shank link, and the landing means is mounted on the shank link to protect the knee joint.

3. A legged walking robot according to claim 2, wherein the landing means is on the shank link to project toward the body in such a way that an upper end of the landing means reaches beyond an axis of rotation of the knee joint in a direction of gravity axis when the robot stands upright such that the knee joint is to be positioned at a location forward of the center of gravity of the robot in the direction of robot advance when coming into the knee-first contact with the floor.

4. A legged walking robot according to claim 2, wherein the landing means is mounted on the shank link to project outwardly from the knee joint such that the knee joint is to be positioned at a location forward of the center of gravity of the robot in the direction of robot advance when coming into the knee-first contact with the floor.

5. A legged walking robot according to claim 1, wherein the landing means is disposed at a location spaced outwardly from the knee joint.

6. A legged walking robot according to claim 5, wherein the landing means is urged to be spaced outwardly from the knee joint.

7. A legged walking robot according to claim 5, wherein a stop is disposed at the space.

8. A legged walking robot according to claim 6, wherein a stop is disposed at the space.

9. A legged walking robot according to claim 1, wherein the landing means comprises an elastic member.

10. A legged walking robot according to claim 9, wherein the elastic member is overlaid on a rigid member mounted at a position adjacent to the knee joint.

11. A legged walking robot according to claim 2, wherein the landing means comprises an elastic member overlaid on a rigid member mount on the shank link.

12. A legged walking robot according to claim 11, wherein the rigid member is cantilevered to the shank link such that a free end of the rigid member is disposed at the location spaced outwardly from the knee joint.

13. A legged walking robot according to claim 12, wherein an urging means is interposed between the space to urge the free end outwardly.

14. A legged walking robot according to claim 1, wherein the robot is a biped robot having the body and two articulated legs each connected to the body through a hip joint and having a knee joint and an ankle joint.

15. A legged walking robot having at least a body and a plurality of articulated legs each connected to the body through a hip joint and having a knee joint and an ankle joint;
   wherein
   the improvement comprises:
      a shock absorbing means is mounted at a position adjacent to the knee joint which is brought into contact with a floor to absorb impact occurring from the contact with the floor when coming into knee-first contact with the floor.

16. A legged walking robot according to claim 15, wherein the hip joint and the knee joint are connected by a thigh link and the knee joint and the ankle joint are connected by a shank link, and the shock absorbing means is mounted on the shank link to protect the knee joint.

17. A legged walking robot according to claim 16, wherein the shock absorbing means is on the shank link to project toward the body in such a way that an upper end of the landing means reaches beyond an axis of rotation of the knee joint in a direction of gravity axis when the robot stands upright such that the knee joint is to be positioned at a location forward of the center of gravity of the robot in the direction of robot advance when coming into the knee-first contact with the floor.

18. A legged walking robot according to claim 16, wherein the shock absorbing means is mounted on the shank link to project outwardly from the knee joint such that the knee joint is to be positioned at a location forward of the center of gravity of the robot in the direction of robot advance when coming into the knee-first contact with the floor.

19. A legged walking robot according to claim 15, wherein the shock absorbing means is disposed at a location spaced outwardly from the knee joint.

20. A legged walking robot according to claim 19, wherein the shock absorbing means is urged to be spaced outwardly from the knee joint.

21. A legged walking robot according to claim 19, wherein a stop is disposed at the space.

22. A legged walking robot according to claim 20, wherein a stop is disposed at the space.

23. A legged walking robot according to claim 15, wherein the shock absorbing means comprises an elastic member.

24. A legged walking robot according to claim 23, wherein the elastic member is overlaid on a rigid member mounted at a position adjacent to the knee joint.

25. A legged walking robot according to claim 16, wherein the shock absorbing means comprises an elastic member overlaid on a rigid member mount on the shank link.

26. A legged walking robot according to claim 25, wherein the rigid member is cantilevered to the shank link such that a free end of the rigid member is disposed at the location spaced outwardly from the knee joint.

27. A legged walking robot according to claim 26, wherein an urging means is interposed between the space to urge the free end outwardly.

28. A legged walking robot according to claim 15, wherein the robot is a biped robot having the body and two articulated legs each connected to the body through a hip joint and having a knee joint and an ankle joint.

* * * * *